2 Sheets—Sheet 1.

W. H. STEWART.

TREADLES FOR SEWING-MACHINES.

No. 7,185. Reissued June 20, 1876.

Witnesses:

Samuel W. Robbins

W. H. Myckoff

Inventor,

William H. Stewart.

N. PETERS, PHOTO-LITHOGRAPHER, WASHINGTON, D. C.

2 Sheets—Sheet 2.

W. H. STEWART.

TREADLES FOR SEWING-MACHINES.

No. 7,185. Reissued June 20, 1876.

Witnesses:

Samuel McRobbins

M. C. Myckoff

Inventor,

William H. Stewart

N. PETERS, PHOTO-LITHOGRAPHER, WASHINGTON, D. C.

UNITED STATES PATENT OFFICE.

WILLIAM H. STEWART, OF BROOKLYN, NEW YORK.

IMPROVEMENT IN TREADLES FOR SEWING-MACHINES.

Specification forming part of Letters Patent No. 144,366, dated November 4, 1873; reissue No. 7,185, dated June 20, 1876; application filed May 4, 1876.

*To all whom it may concern:*

Be it known that I, WILLIAM H. STEWART, of Brooklyn, in the county of Kings and State of New York, have invented an Improvement in Treadles for Sewing-Machines, of which the following is a specification:

In treadles of sewing-machines it is usual to place the fulcrum or axis of motion below the foot-plate; hence, as the treadle oscillates upon this point, the ankle-joints of the operator swing in the arc of a circle, and communicate to the lower joints of the legs a pendulous motion, and to the thighs and hip-joints a tremulous and jerking movement that is generally considered detrimental to health, especially with females.

My invention is made for preventing motion at either the knee or hip joints in running the sewing-machine, and this is accomplished by swinging the treadle upon centers that are in line with the ankle-joints, so that the foot will move upon the ankle-joints by the action of the muscles of the leg without any vibratory or jarring motion at the hip-joints, pelvis, or base of the vertebræ.

Figure 1:
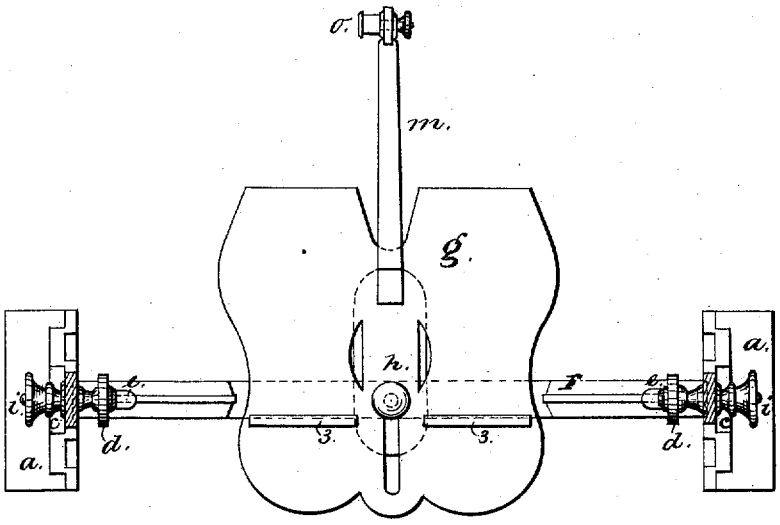
Figure 2:
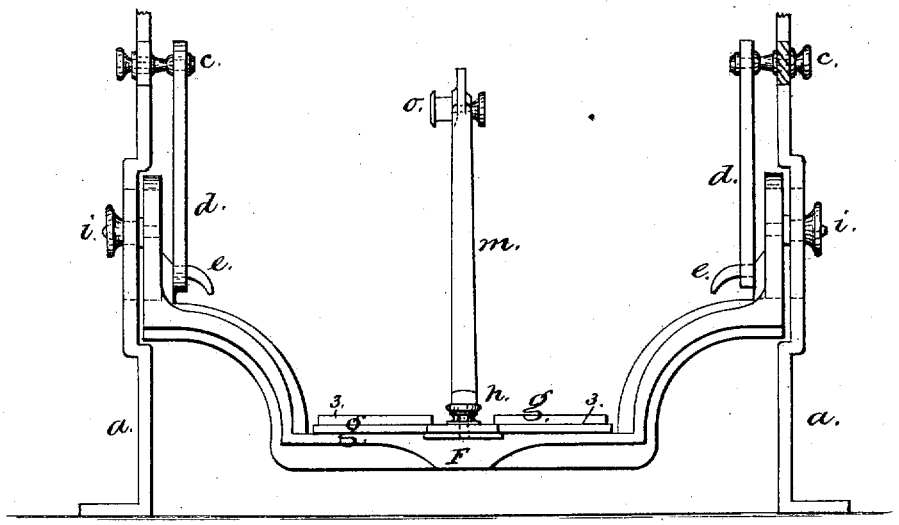
Figure 4:
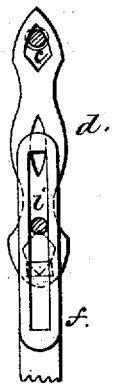
Figure 3:
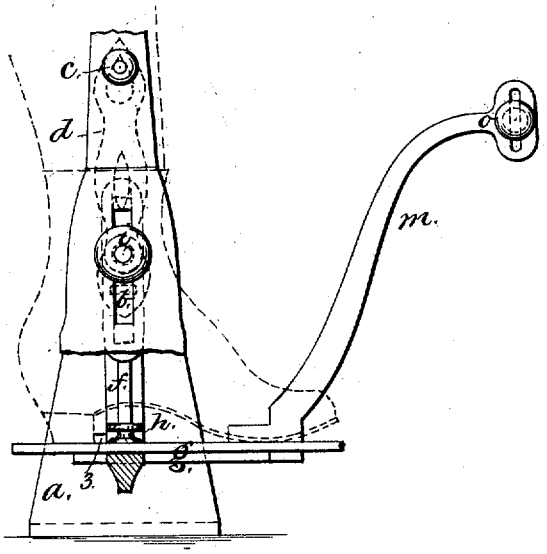

In the drawing, Figure 1 is a plan of said treadle. Fig. 2 is a front view of the same. Fig. 3 is a side view, partially in section; and Fig. 4 is an elevation of the link and a portion of the treadle-yoke detached.

The frames *a* of the sewing-machine are of the usual character, except that they may be provided with the slots *b* and pivots *c;* or, if desired, the frames *a* may be separate from the ordinary sewing-machine frame, or set within the wooden cabinet-case, or otherwise retained in place. The links *d* hang from the pivots *c*, and suspend the treadle-yoke F by the hooks *e* or joint-connections. Upon the treadle-yoke F are the foot piece or pieces *g*. These should be provided with a rib or ledge, 3, against which the boot or shoe heel rests, and, by the clamping-screw *h* and slot in the foot-piece *g*, such foot-piece or foot-board can be adjusted transversely backward and forward upon the yoke F, in order to accommodate the shape of shoe and heel to bring the center of the ankle joint of the operator in a vertical plane passing longitudinally through the treadle-yoke. At the ends of the treadle-yoke there are vertical slots or openings corresponding to the slots *b*, and in such slots *b* there are the clamping-nuts and pivot-pins *i*.

To adjust the treadle, it is necessary to raise or lower the pivot-pins in the slots *b*, and clamp them by their nuts to frame *a* at the proper point, so as to be in line vertically with the center of ankle-joint. The foot-pieces *g* are adjusted, if necessary, horizontally backward or forward upon the treadle-yoke to position the ankle-joints in line with such pivots *i*, and when this is done the treadle will be moved by the action of the feet without disturbing the knee or hip joints of the operator.

As a further convenience, I provide for adjusting the connections between the arm *m*, that extends from the treadle-yoke and the pitman to the sewing-machine crank, by placing the joint-pin *o* for such pitman in a slot at the end of the arm *m*, and clamping the same by a nut; thereby the general position of the foot-pieces *g* can be tipped either one way or the other, according to the lengthening or shortening the distance between the treadle and the crank of the sewing-machine.

It will be apparent that the treadle-yoke and its parts hang from the links *d*, or may be supported by the pivot-pins *i*.

I claim as my invention—

1. The foot-board of a sewing-machine treadle, adjustable horizontally backward and forward upon its supports, in combination with a bell-cranked rod or yoke, for the purpose of bringing the ankle-joints of the operator up to a plane vertical to the axis of the treadle, substantially as described and set forth.

2. The treadle rod or yoke F, suspended by the links *d*, and swinging upon the pivot-pins *i*, that are adjustable vertically in the slots of the yoke and frame *a*, substantially as and for the purposes set forth.

3. The foot-pieces *g*, adjustable horizontally upon the treadle-yoke F, in combination with the adjustable pivots and treadle, substantially as and for the purposes set forth.

4. The arm *m* and adjustable connections for the pitman to the sewing-machine crank, in combination with the swinging sewing-machine treadle yoke and foot-piece, substantially as and for the purposes set forth.

Signed by me this 9th day of May, 1876.

WILLIAM H. STEWART.

Witnesses:

SAMUEL H. ROBBINS,
WM. C. WYCKOFF.